(12) United States Patent
Corghi

(10) Patent No.: US 6,588,273 B2
(45) Date of Patent: Jul. 8, 2003

(54) FIXTURE FOR LOCKING MOTORCYCLE WHEELS ONTO BALANCING MACHINES

(75) Inventor: Remo Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 56 days.

(21) Appl. No.: 09/929,001

(22) Filed: Aug. 15, 2001

(65) Prior Publication Data

US 2002/0026829 A1 Mar. 7, 2002

(30) Foreign Application Priority Data

Sep. 1, 2000 (IT) ..................... RE2000A0082

(51) Int. Cl.⁷ .............................. G01M 1/06
(52) U.S. Cl. ..................................... 73/487
(58) Field of Search ............. 73/487, 460; 157/14

(56) References Cited

U.S. PATENT DOCUMENTS 4,489,608 A    12/1984   Borner ..................... 73/487
5,900,548 A  * 5/1999   Buzzi ...................... 73/487

* cited by examiner

Primary Examiner—John E. Chapman
(74) Attorney, Agent, or Firm—Browdy and Neimark, P.L.L.C.

(57) ABSTRACT

A fixture for locking motorcycle wheels onto balancing machines, comprising a spindle to be removably fixed onto the direct extension of the balancing shaft to receive the hub of the wheel to be balanced, means for fixing the hub onto the spindle, and means for rotating said wheel about the axis of said shaft; said means comprise two independent operating devices, of which one, known as the locking device, is provided to axially secure said hub onto said spindle, and the second, known as the dragging device, comprises a dragging part arranged to slide parallel to the balancing shaft between a rest position in which it is spaced from the wheel locked on the spindle, and a working position in which it is in contact with and torsionally engages a wheel portion external to the hub.

17 Claims, 5 Drawing Sheets

FIXTURE FOR LOCKING MOTORCYCLE WHEELS ONTO BALANCING MACHINES

This invention relates to a fixture of universal type for locking motorcycle wheels in general onto the shaft of balancing machines.

The hub of such wheels is known to be provided with rolling bearings enabling the wheel to be centered on the balancing shaft, but not rotated by it.

Consequently, the shafts of machines for balancing motorcycle wheels must be provided with means for rotating the wheel.

An example of such means is described in U.S. Pat. No. 4,489,608, the text of which is to be understood as totally included in this description for opportune reference.

These comprise a wheel carrier spindle which is coaxially fixed to the end of the balancing machine shaft, and on which there are slidingly mounted, starting from a shoulder rigid with said shaft, at least one spring, a first centering cone to engage one end of the hub of a motorcycle wheel mounted on the spindle, a second centering cone to engage the opposite end of said hub and provided with means for forcing it towards said first cone, and at least one elastically deformable dragging member rigid with the shaft and surrounding said at least one spring and said first centering cone, to contact a wheel portion external to the hub.

In the aforesaid known system, before mounting the wheel to be balanced said at least one spring is in the completely unloaded state, and said at least one dragging member, such as a rubber ring or the like, is distant from the wheel.

When the wheel has been mounted on the wheel carrier spindle, practically in contact with the first centering cone, or inner cone, it is pushed towards the machine structure causing the second centering cone, or outer cone, to move axially along said wheel carrier spindle.

Said axial movement causes the inner cone to withdraw against the resistance offered by the at least one spring which, by loading, provides the force for locking the wheel hub between the two cones.

The said axial movement also brings said at least one elastically deformable dragging member into contact with the wheel portion external to the hub, with the result that the wheel is torsionally engaged with said shaft.

The aforedescribed known system has proved unsatisfactory at least for the following reasons.

Firstly, it does not allow independent adjustment of the force used to axially lock the wheel and the force used to engage the dragging member with the wheel. Moreover, said system can result in measurement errors, hence balancing errors, because of misalignments which can exist between said at least one dragging member and the wheel carrier spindle, in particular if said at least one dragging member is not rigid with the shoulder on the balancing machine shaft, and above all if the said dragging member comprises two or more adjacent rings separated from each other.

The main object of the present invention is to obviate the aforestated drawback within the context of a simple, rational and reliable construction.

Said object is attained by a fixture presenting the characteristics indicated in the claims.

It comprises a spindle to be removably fixed onto the direct extension of the balancing shaft to receive the hub of the wheel to be balanced, means for fixing the hub onto the spindle, and means for rotating said wheel about the axis of said shaft.

According to the invention, said means comprise two independent operating devices, to be described in detail hereinafter, of which one, known as the locking device, is provided to axially secure said hub onto said spindle, and the other, known as the dragging device, comprises a dragging part arranged to slide parallel to the balancing shaft between a rest position in which it is spaced from the wheel locked on the spindle, and a working position in which it is in contact with a wheel portion external to the hub. By virtue of the aforestated, all the objects of the invention are attained.

In this respect, the provision of said two independent devices enables the two forces for axially locking the wheel and, respectively, for rotating the wheel about itself, to be chosen as required.

The characteristics and the constructional merits of the invention will be apparent from the ensuing detailed description given with reference to the figures of the accompanying drawings, which illustrate a particular preferred embodiment thereof by way of non-limiting example.

Figure 1:
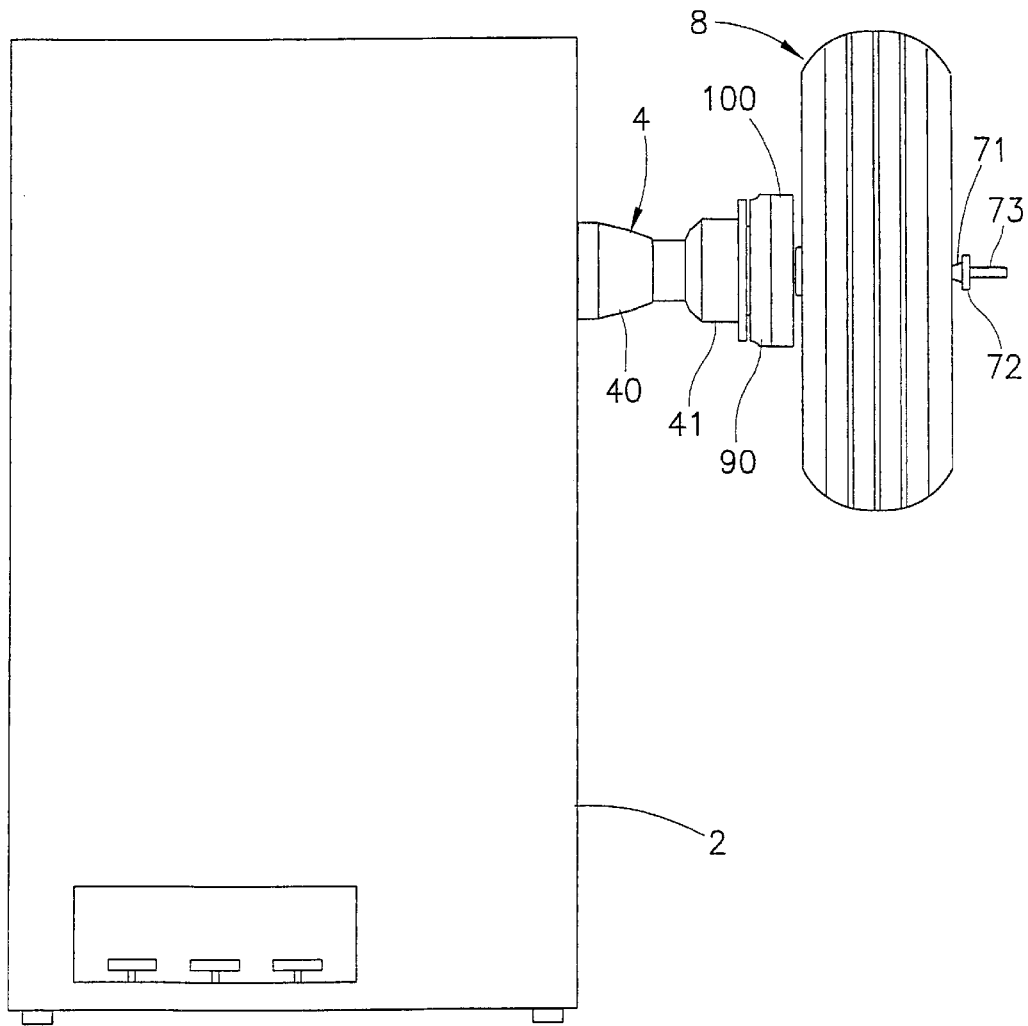
FIG. 1 is a schematic side elevation showing a balancing machine provided with a fixture of the invention.
Figure 2:
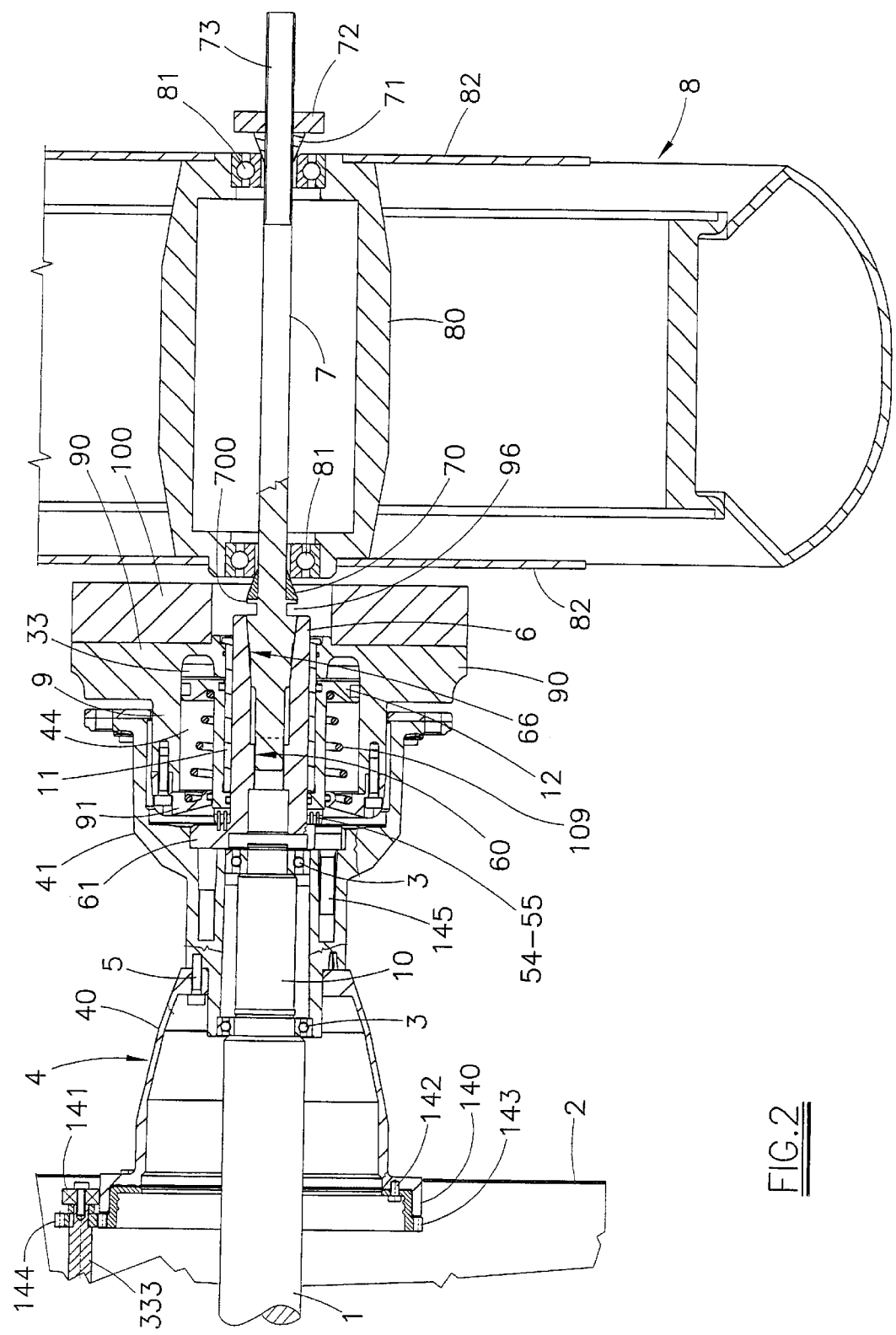
FIG. 2 is a section through a part of the preceding figure on an enlarged scale, in which the fixture of the invention is shown in the configuration in which it maintains a motor-scooter wheel axially locked.
Figure 3:
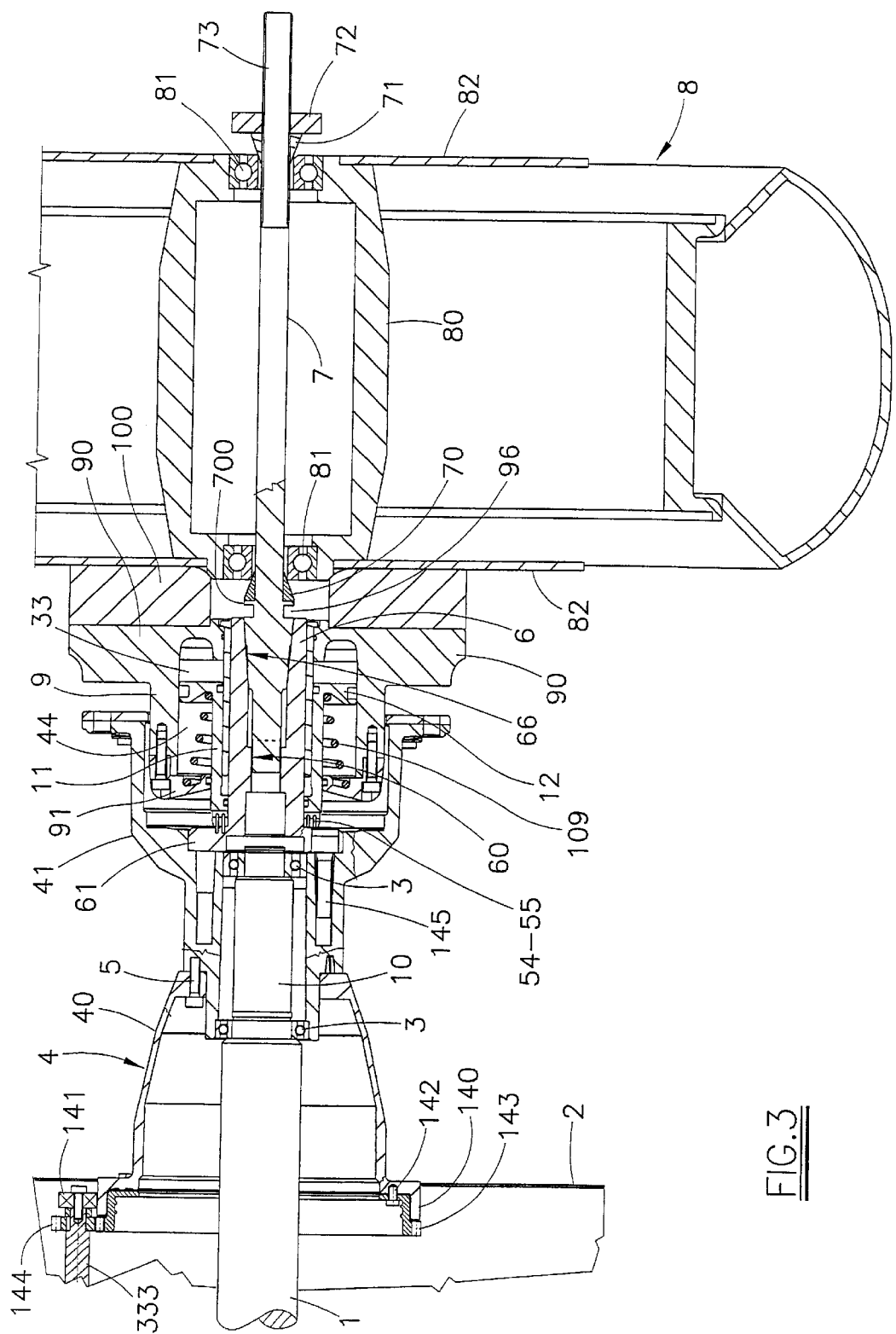
FIG. 3 is a view similar to the preceding, showing the invention in the configuration in which the same wheel is also locked torsionally, before or after the balancing stage.

Said figures, and in particular FIGS. 1 to 3, show the stationary horizontal shaft 1 of a balancing machine 2, this latter not being shown in detail as it is of usual type. It should be noted that the characteristic elements of the invention can also be used on balancing machines with a vertical balancing shaft, and on machines with a rotating balancing shaft.

As can be seen in FIGS. 2 and 3, said shaft 1 presents an end portion of lesser diameter on which a dragging enclosure 4 is rotatably mounted by way of two rolling bearings 3.

Said enclosure 4 consists of two coaxial hollow profiled parts 40 and 41 joined together by a circumferential series of equidistant screws 5, and is substantially in the shape of a sand-glass with said bearings 3 mounted at its narrow portion. The rear end of the rear part 40 presents a cup-shaped cylindrical rim 140 contacted by an overlying idle balancing roller 141.

To the interior of the cylindrical rim 140 there is secured, by a circumferential series of screws 142, the hub of a cup-shaped coaxial ring gear 143, the toothing of which is contained within the machine casing 2.

Within said casing there is a pinion 144 which engages said ring gear 142 and is keyed onto the exit shaft 333 of an electric drive motor (not shown).

As can be seen in FIGS. 2 and 3, the pinion 144 and the roller 141 are coaxial, said roller 141, besides its function of balancing the enclosure 4, also performing the said function of maintaining the pitch circle diameters of said gears 143 and 144 correctly positioned.

Figure 4:
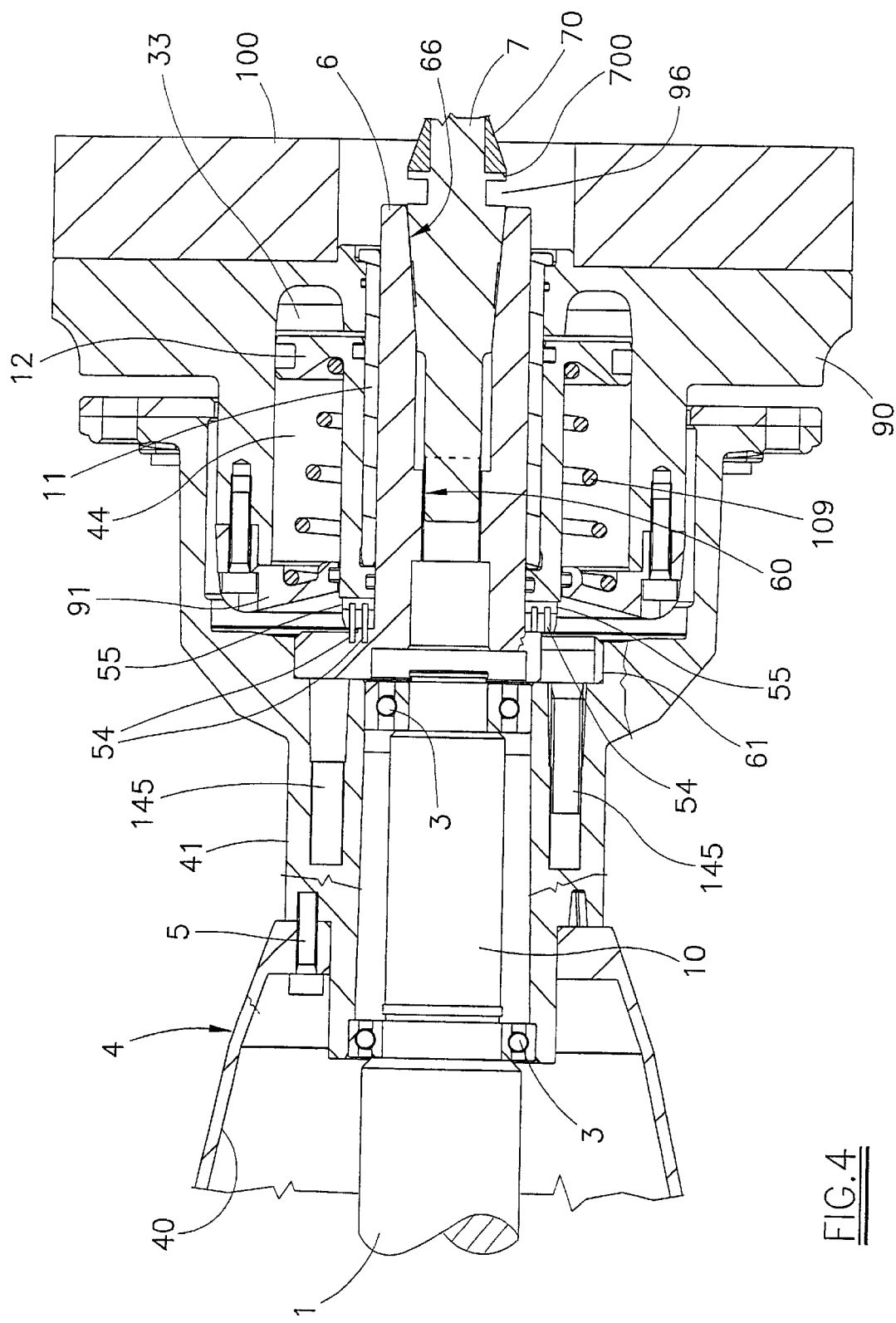
FIG. 4 is a part of FIG. 3 on an enlarged scale.

As can also be seen in FIG. 4, the rear flange 61 of an internally threaded sleeve 6 coaxial to the shaft 1 is fixed to the end of the front part 41 of the enclosure 4 by a circumferential series of equidistant screws 145.

The interior of the sleeve 6 comprises in its rear part a threaded portion 60, and in its front part a frusto-conical portion 66 separated from the preceding by a depressed portion.

The rear end of a spindle 7 which supports the wheel 8 to be balanced is screwed into said threaded portion 60.

The said spindle 7 also presents a frusto-conical portion arranged to engage said internal frusto-conical portion of the sleeve 6, said engagement ensuring coaxiality between the spindle 7 and sleeve 6, hence also between the spindle 7 and shaft 1. In front of the frusto-conical portion of the spindle 7 there is a key seat 96 enabling it to be mounted and removed.

The wheel 8 shown in FIGS. 2 and 3 is of the type suitable for a motorscooter, but the invention is well suitable for also locking other types of motorcycle wheels in general, for example wheels with spokes.

Specifically, the wheel 8 illustrated comprises a hub 80, two opposing bearings 81, and two opposing brake discs 82.

According to the invention, the wheel 8 is secured axially and torsionally by two devices of independent operation, one of which is associated with the wheel carrier spindle 7, and the other is associated with the sleeve 6.

For axially locking the wheel 8, the spindle 7 comprises two centering elements, of conical shape in the illustrated example, the inner of which is indicated by 70 and the outer by 71, they being made to engage the inner rings of the bearings 81 by the thrust of a clamping ring nut 72 which is screwed onto the threaded free end 73 of the spindle 7 (see FIGS. 1 to 3).

Suitable cylindrical bushes could be used instead of said centering elements 70 and 71.

Specifically, the two conical centering elements, or cones, 70 and 71 are mounted on the spindle 7 with a precise free sliding fit, the inner cone 70 then resting against a stop ledge 700 provided on the spindle 7, in the immediate vicinity of said key seat 96.

The means described hereinafter are provided to rotate the wheel 8.

These comprise a slidable cap 9 with a holed end, which is coaxial to the shaft 1 and within which there is a coaxial slidable bush 11.

Said bush 11 is fixed to the cap 9 by a hot forced fit, and is mounted on the sleeve 6 with a precise free sliding fit.

Between the outer cylindrical surface of the bush 11 and the inner cylindrical surface of the cap 9 there is defined an annular interspace lying between a thrust ring 90 provided at the mouth of the cap 9, and an annular cover 91 fixed to the holed end of the cap 9.

Said interspace is divided into two opposing operational chambers, namely an outward chamber 33 and a return chamber 44, by a hollow guide piston 12.

The outward chamber 33 is sealed as shown in FIGS. 2 to 4, whereas the return chamber 44 is not, and contains a conical repositioning spring 109 situated between the cover 91 and the end of the piston 12.

Said spring is practically in the unloaded state when the cap 9 is in the retracted rest position of FIG. 2.

The inner cylinder surface of the piston rod presents two portions of different diameters and lengths, of which that of greater diameter and length is slidingly mounted on the bush 11 by way of a seal ring, and that of smaller diameter and length is slidingly mounted on the sleeve 6 by way of a dust protection ring. There are also provided first torsional coupling means between the flange 61 of the sleeve 6 and the piston 12, and second torsional coupling means between the piston 12 and the cap 9.

Said first means are provided at the free end of the rod of the piston 12, which free end extends beyond the cover 91 where two diametrically opposing identical frontal notches or recesses 55 are present (see FIGS. 2 to 5) with which there engage two diametrically opposing pairs of split longitudinal pegs projecting from said flange 61.

Figure 5:
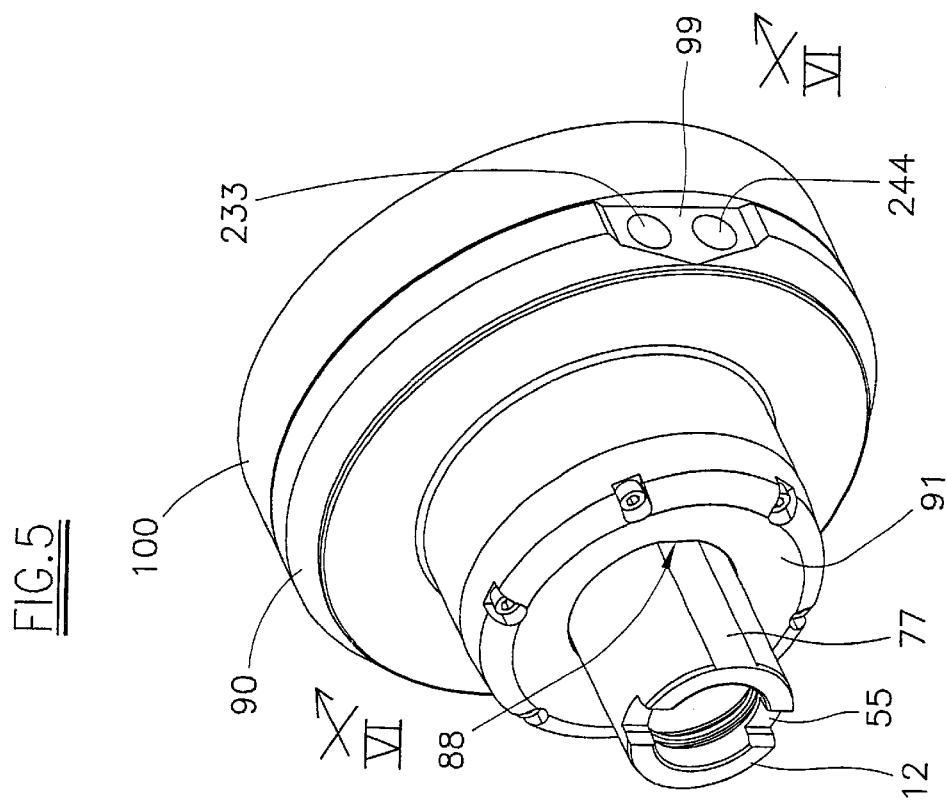
FIG. 5 is a perspective view of the pneumatically operated device provided to rotate the wheel.

As best seen in FIG. 5, said second means comprise a longitudinal flattening 77 formed on the outer surface of the rod of the piston 12, and a facing chordal flat surface 88 which interrupts the circular pattern of the inner hole of the annular cover 91.

Figure 6:
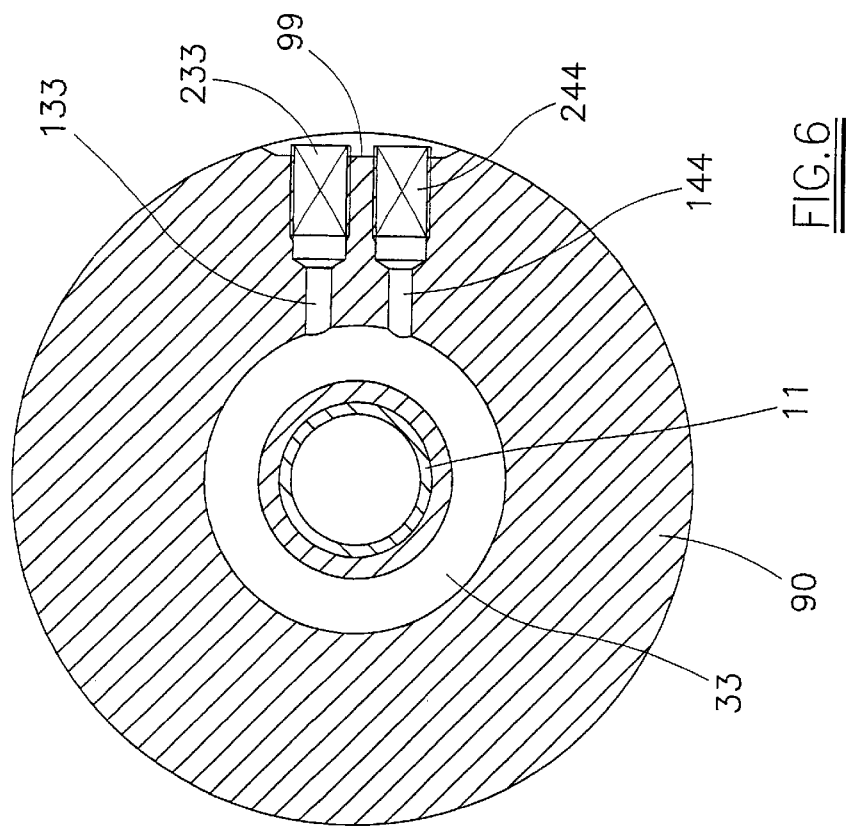
FIG. 6 is the section VI—VI of FIG. 3.

As shown in FIGS. 5 and 6, to the side of the ring 90 there is a recess 99 from which there extend two conduits 133 and 144 leading to said outward operating chamber 33.

An operating fluid, typically compressed air, can be fed into and extracted from said operating chamber 33 by virtue of respective valves 233 and 234 (see FIG. 6) positioned in said recess 99.

One of said valves is provided for feeding said air, typically by means of a tire operator's gun, and the other, for example provided with a manually operable needle valve, is provided for discharging the air present in the chamber 33. Finally, on that transverse face of the ring 90 of the cap 9 which faces the wheel 8 there is applied an annular pad 100 formed of an elastically deformable material of high friction coefficient.

For example, said pad 100 is formed of natural rubber.

As a variant it can be formed of an expanded synthetic material, preferably of the closed cell type.

Alternatively it can consist of an air chamber provided with a rigid lateral connection ring.

The invention operates as follows.

On mounting the wheel 8 to be balanced, the cap 9 is in its retracted position of FIG. 2, in which the flange 90 is situated a short distance from the front end of the enclosure 4, and the front face of the pad extends slightly beyond the shoulder 700 on the spindle 7.

When the wheel 8 has been mounted on the spindle 7, it is locked axially between the two centering cones 81 by the thrust of the ring nut 72 which is tightened onto the threaded end 73 of the spindle 7 (see FIG. 1).

After this, compressed air is fed, for example by a usual tire operator's gun, into the chamber 33, by which the cap 9 moves towards the wheel 8 to compress the spring 109, and the pad 100 engages the facing end of the hub 80 and the adjacent portion of the brake disc 82 (see FIG. 3).

The balancing operation is then proceeded with in the usual manner, during which the wheel 8 is rotated together with the spindle 7, whereas the shaft 1 remains at rest as already stated, after which the wheel 8 is removed.

For said removal the valve provided for discharging the air present in the chamber 33 is opened with the result that the air is pushed out by the cap 9, which retracts by the effect of the elongation of the spring 109.

At this, the pad 100 disengages from the hub 80 of the wheel 8, which can then be released by removing the ring nut 72 and the outer centering cone 71 from the spindle 7.

The merits and advantages of the invention are apparent from the aforegoing and from an examination of the accompanying figures.

The invention is not limited to that illustrated and described, but comprises all technical equivalents of the invention and their combinations, if implemented within the context of the following claims.

For example, the advancement and retraction of the pad 100 can be achieved by a male-female screw linkage system.

Said system can comprise for example a tube provided with an end flange carrying the pad 100, its internal bore having a thread engaging a matching screw thread provided on the sleeve 60.

The tube can also be provided with a transverse locking screw for engaging said screw thread on the sleeve.

What is claimed is:

1. A fixture for locking motorcycle wheels onto balancing machines, comprising a spindle to be removably fixed onto the direct extension of the balancing shaft (1) to receive the hub (80) of the wheel (8) to be balanced, means for fixing the hub onto the spindle, and means for rotating said wheel about the axis of said shaft, characterised in that said fixing and rotating means comprise two independent operating devices, of which one, known as the locking device, is provided to axially secure said hub onto said spindle, and the second, known as the dragging device, comprises a dragging part (100) arranged to slide parallel to the balancing shaft (1) between a rest position in which it is spaced from the wheel (8) locked on the spindle, and a working position in which it is in contact with and torsionally engages a wheel portion external to the hub.

2. A fixture as claimed in claim 1, characterised in that said balancing shaft is stationary, and is provided with a motorized rotating enclosure which is rotatably mounted on the shaft and presents an internal coaxial sleeve provided for fixing said spindle.

3. A fixture as claimed in claim 1, characterised in that said locking device comprises two centering elements slidingly mounted on said spindle, of which the inner is arranged to rest against a stop ledge rigid with said spindle, and the outer is associated with a threaded thrust member to be screwed onto a thread provided at the free end of the spindle.

4. A fixture as claimed in claim 3, characterised in that said centering elements are conical.

5. A fixture as claimed in claim 2, characterised in that said dragging device comprises a piston which is mounted, and torsionally locked, on said sleeve, and a cap which is slidingly mounted, and torsionally locked, on said piston, said cap supporting said dragging part, between said cap and said piston there being interposed means for sliding the dragging part between said two opposing rest and working positions.

6. A fixture as claimed in claim 5, characterised in that the torsional engagement between said piston and said sleeve is achieved by at least two diametrically opposing frontal notches or projections provided at the end of the piston, and two matching diametrically opposing frontal projections or notches provided on a flange of the sleeve.

7. A fixture as claimed in claim 5, characterised in that the torsional engagement between said piston and said cap is achieved by a longitudinal flattening formed on the piston, and a flat slide surface which contacts said flattening and is provided by a chordal straight portion which interrupts the circular development of the cap mouth through which said rod passes.

8. A fixture as claimed in claim 5, characterised in that said means comprise a first and a second annular chamber which are disposed on one side and the other of said piston, and of which one is sealed and opens to the outside of the cap via two valves provided for feeding and discharging an operating fluid, which slides the cap towards the wheel, and the other communicates with the external environment and contains elastic means for repositioning the cap when said first chamber is being discharged.

9. A fixture as claimed in claim 8, characterised in that said elastic repositioning means comprise a spring situated between said piston and a shoulder of the cap.

10. A fixture as claimed in claim 8, characterised in that said operating fluid is compressed air.

11. A fixture as claimed in claim 2, characterised in that:

said dragging device comprises a piston which is mounted, and torsionally locked, on said internal coaxial sleeve, a cap which is slidingly mounted, and torsionally locked, on said piston, said cap having a mouth and supporting said dragging part, and a flange provided on said mouth of said cap between said cap, and said piston there being interposed means for sliding the dragging part between said two opposing rest and working positions; and said dragging part comprises an annular pad which is formed of an elastically deformable material of high friction coefficient and is fixed on said flange provided on said mouth of said cap.

12. A fixture as claimed in claim 1, characterised in that said dragging part comprises an annular pad which is formed of an elastically deformable material of high friction coefficient.

13. A fixture as claimed in claim 12, characterised in that said pad is formed of natural rubber.

14. A fixture as claimed in claim 12, characterised in that said pad is formed of an expanded synthetic material.

15. A fixture as claimed in claim 14, characterised in that said expanded material is of closed cell type.

16. A fixture as claimed in claim 1, characterised in that said balancing shaft is fixed.

17. A fixture as claimed in claim 16, characterised in that said spindle is integral with said balancing shaft.

* * * * *